June 13, 1967   J. R. SQUIRE   3,325,034
DRIP CONTROLLING FITMENT
Filed April 26, 1966

INVENTOR.
James R. Squire
BY Fredrik H. Braun
ATTORNEY

United States Patent Office 3,325,034
Patented June 13, 1967

3,325,034
DRIP CONTROLLING FITMENT
James R. Squire, Cincinnati, Ohio, assignor to The Procter & Gamble Company, Cincinnati, Ohio, a corporation of Ohio
Filed Apr. 26, 1966, Ser. No. 545,336
5 Claims. (Cl. 215—40)

This invention relates to drip controlling fitments for glass bottles and the like. More particularly, the invention relates to a drip controlling fitment which is designed to inhibit dripping of edible oils and like products when poured from glass containers in which such products are normally packaged, shipped and stored.

The problem of preventing drip and surface rundown when pouring edible oil products from glass containers has defied a simple and reliable solution. Numerous devices have been designed to accomplish this objective but most of them have proven to be either ineffective or lacking in commercial acceptability for reasons of cost, fragility, and/or complexity. For the above reasons, the provision of a satisfactory drip controlling fitment that is simple, effective and inexpensive has been a long sought improvement in the field of packaging edible oil products.

The principal object of this invention is the provision of a drip controlling fitment for glass bottles containing edible oil products that is reliable in operation and inexpensive to manufacture thereby overcoming the above-stated difficulties.

Another object of the invention is the provision of a drip controlling fitment of the aforesaid character which is so constructed and designed that its drip control surfaces will not be contaminated by contact with the bottle cap. Such contact can adversely affect the dripless pouring characteristics of a fitment either by rubbing transfer of coating material from the cap to the control surfaces or by wetting of the drip control surfaces caused by compression of residual oil that may remain after pouring.

Still another object of the invention is the provision of a drip controlling fitment which is so constructed and designed that residual oil droplets retained by the fitment after each usage are drawn off into the stream of flow on subsequent pouring of edible oil from the glass container.

The nature and substance of the invention can be briefly summarized as comprising a drip controlling fitment for a glass bottle having edible oil therein, the bottle having a generally conventional finish, the upper portion of which is modified by the addition of an outwardly projecting annular rib formed integrally with the finish. A plastic drip controlling fitment is provided in the form of an annular ring-like body having a continuous internal channel that snugly engages said annular rib. The fitment is so formed that it includes a narrow and thin annular ring portion in its lower region which extends radially outwardly from the body of the fitment to provide a drip controlling channel and ledge entirely below the sealing surface of the bottle finish.

While the specification concludes with claims particularly pointing out and distinctly claiming the subject matter regarded as forming the present invention, it is believed the invention will be better understood from the following description taken in connection with the accompanying drawing in which:

Figure 1:
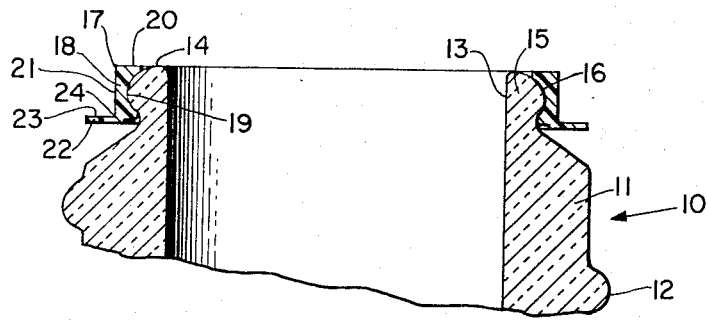
FIGURE 1 is a fragmentary cross section in elevation illustrating the upper portion of a glass bottle having the drip controlling fitment assembled thereto.

Referring now to the drawings and particularly FIGURE 1 the drip controlling fitment is shown assembled to a bottle 10 which has only its upper portion shown for purposes of illustration. In the practice of the present invention the bottle 10 is preferably glass since the product therein is an edible oil. Edible oil products can be contaminated with undersirable flavors on prolonged contact with presently known plastic bottle materials. The portion of the bottle 10 shown is the upper end of the finish 11 which is generally conventional and includes a thread 12 and a pouring outlet 13 as well as an annular sealing surface 14. The finish 11 as illustrated is modified by the addition of an upwardly projecting annular portion 15 having an outwardly projecting annular rib 16 at the upper portion thereof.

The drip controlling fitment 17 is illustrated in its assembled condition with the bottle 10. The fitment 17 is preferably formed from any well known plastic material having resilient and thermoplastic properties. In particular, polyethylene and like materials that are readily injection molded have been found effective in the fabrication of the drip controlling fitment 17 of the present invention.

The general configuration of the fitment 17 is that of an annular ring-like body 18 having a continuous internal channel 19 which is shaped to snugly engage the rib 16. The material used in making the fitment 17 is sufficiently resilient to permit assembly over the rib 16 and to permit removal thereof without any permanent distortion or deformation as will be familiar to those skilled in the art. The upper surface 20 of the fitment 17 is substantially in the plane of the sealing surface 14 of the glass bottle. The outer cylindrical surface 21 terminates at its lower end in an outwardly projecting narrow and thin annular ring portion 22. The upper surface of the ring portion 22 comprises a drip controlling ledge 23. A continuous external channel 24 is formed at the intersection of the cylindrical surface 21 with the surface of the ledge 23.

Figure 2:
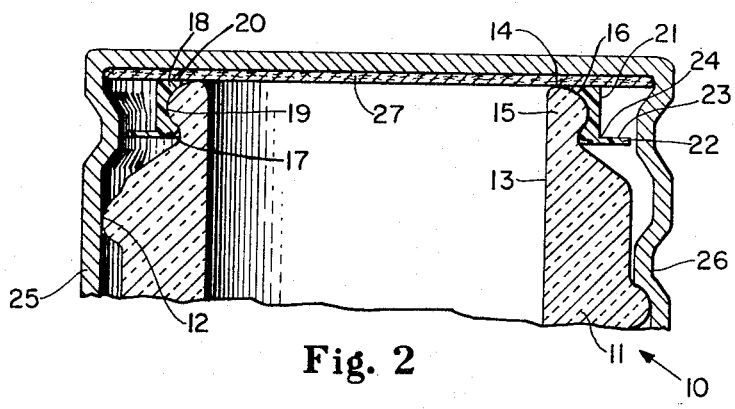
FIGURE 2 is a fragmentary cross section in elevation similar to FIGURE 1 showing a closure cap assembled on the bottle finish.

FIGURE 2 illustrates the bottle of FIGURE 1 with the fitment 17 secured as previously described. In addition, a conventional closure element which may be a metal or plastic cap 25 is attached by screw threads 26 which engage the threads 12 of the bottle 10. The closure cap 25 includes a conventional liner 27 which bears against the sealing surface 14 to provide a gas tight seal thus preventing oxidation and deterioration of edible oil products in the glass bottle 10.

One of the important aspects of the invention resides in forming the fitment 17 such that the drip controlling ledge 23 is not contacted by the liner 27 when the cap 25 is secured to the bottle as shown in FIGURE 2. Such contact can result in contamination of a drip controlling surface by the usual coatings present on the outer surface of the cap liner 27. The contamination is not harmful in the sense that it will affect the edible characteristics of the oil product in the bottle when poured over a surface such as the surface 20. It merely has an adverse effect on surfaces that are used to achieve dripless pouring characteristics.

Figure 3:
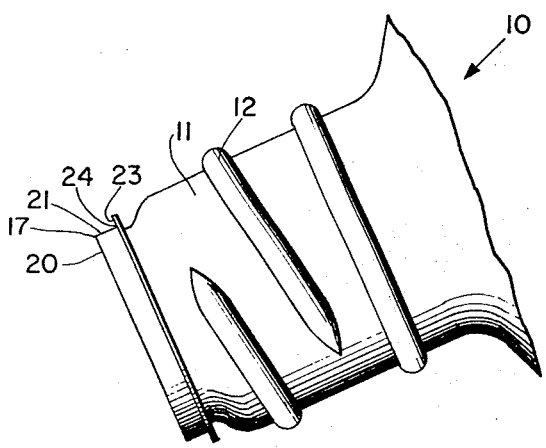
FIGURE 3 is a fragmentary elevation showing the upper end of the bottle and fitment in their pouring attitude.

On removal of the cap 25 the liquid edible oil in the bottle 10 can be poured by tilting the bottle in conventional fashion as illustrated, for example, in FIGURE 3. The oil will flow through the pouring outlet 13. When the bottle is returned to its upright position, liquid droplets on the sealing surface 14 of the bottle 10 and/or on the upper surface 20 of the fitment 17 will either return into the bottle by way of the pouring outlet 13 or they may run down the cylindrical surface 21 of the fitment 17. In the latter case such droplets tend to adhere and be retained in the continuous channel 24 between the cylindrical surface 21 and the ledge 23. Droplets so held and retained are not disturbed when the closure cap 25 is reattached to the bottle threads. On the next pouring from the bottle 10 the collected droplets are drawn off the ledge 23 and into the main stream of flow thus leaving the channel 24 between the cylindrical surface 21 and the ledge 23 sufficiently free to store residual oil droplets that are formed when pouring is again stopped.

The provision of a drip controlling ledge 23 substantially below the surface 14 provides still another advantage. That is, the drip controlling ledge 23 cannot be wetted by compression of residual oil droplets remaining thereon when the cap 25 is screwed down forcing the liner 27 against the sealing surface 14. Contact of the liner 27 against the upper surface 20 of the fitment 17 does not affect the drip controlling characteristics of the fitment.

The edible oil products as described herein (sometimes referred to as "edible oils") include any liquid edible material which contains a significant amount, i.e., about 30% by weight or greater, of one or a mixture of normally liquid glyceride oils. These edible glyceride oil products include, for example, cooking oils, salad oils, salad dressings, liquid shortenings, etc.

Glyceride oils suitable for use in the oil products discussed herein are those which can be derived from animal, vegetable or marine sources, including naturally-occurring triglycerides such as cottonseed oil, soybean oil, rapeseed oil, crambe oil, safflower seed oil, sesame seed oil and sardine oil. Also, suitable liquid glyceride oil fractions can be obtained from palm oil, lard and tallow, as for example, by fractional crystallization or directed interesterification followed by separation of the oil. Oils predominating in glycerides of unsaturated acids may require some hydrogenation to maintain flavor, say to an I.V. of from about 95 to about 115, but care should be taken not to hydrogenate the oil or otherwise process it so that the oil loses its liquid character.

Of course, mixtures of the above oils or other glyceride oils can be used in the edible glyceride oil products, and they can contain additives, such as emulsifiers, antioxidants, etc.

In the use of a glass container with a plastic drip controlling fitment 17 as described for the above edible oil products, it has been found that certain critical relationships are necessary with regard to the width and thickness of the annular ring portion 22. In particular, it has been found that the width of the ledge 23 should be from about .050" to about .065" and the thickness of the annular ring portion 22 should be from about .005" to about .015". In addition, the ratio of width to thickness is preferably from about 4:1 to about 13:1. In a preferred embodiment the width of the ledge 23 is .060" and the thickness of the ring portion 22 is .010". The preferred ratio of width to thickness is 6:1.

Drip control of edible oils by the use of the fitment of the present invention can be further improved by coating the pouring and drip controlling surfaces of the fitment (the surfaces 20, 21 and 23) with a fluorochemical material of the type disclosed in the application of Edward A. Fox, Serial Number 486,522, filed September 10, 1965, and commonly owned by the assignee of the present application. Satisfactory fluorochemical coating materials for this purpose are those available from the Minnesota Mining and Manufacturing Company, St. Paul, Minn., and selected from a group consisting of materials identified by their code numbers L-1632 and L-1656. The particular preferred member of this class is L-1656.

While particular embodiments of the invention have been described and illustrated it will be obvious to those skilled in the art that various changes and modifications can be made without departing from the spirit and scope of the invention and it is intended to cover in the appended claims all such changes and modifications that are within the scope of this invention.

What is claimed as new is:

1. A drip controlling fitment for a glass bottle having an edible oil therein, said bottle having a generally conventional bottle finish including an annular sealing surface at its uppermost end, an annular radial rib formed externally of said finish below said sealing surface, a drip controlling fitment molded from a resilient thermoplastic material and comprising an annular ring-like body having a continuous internal channel snugly engaging said rib, said fitment having an upper surface terminating in a depending cylindrical surface which terminates at its lower end in an outwardly projecting annular ring portion, the upper surface of said ring portion forming a drip controlling ledge, a continuous external channel being formed at the intersection of the cylindrical surface and the ledge, the width of said ledge being substantially greater than the thickness of said ring portion such that the ratio of width to thickness is from about 4:1 to about 13:1, said fitment cooperating with said finish to control dripping when pouring of edible oil from said bottle is stopped by catching and retaining oil droplets in the external channel of the fitment to prevent oil droplets from running down the outside surface of said bottle beneath the plane of said ledge.

2. A drip controlling fitment for a glass bottle as claimed in claim 1, said bottle having a closure cap removably secured to said finish, a liner in said closure cap, the structure of said fitment being such that said drip controlling ledge and said continuous external channel are not contacted by said cap and liner when said cap is secured to said finish such that said liner bears against the annular sealing surface of said bottle.

3. A drip controlling fitment as claimed in claim 2 wherein said ledge has a width of from about .050" to about .065" and said annular ring portion has a thickness of from about .005" to about .015".

4. A drip controlling fitment as claimed in claim 2 wherein said ledge has a width of about .060" and said annular ring has a thickness of about .010".

5. A drip controlling fitment as claimed in claim 2 wherein the pouring and drip controlling surfaces are coated with a fluorochemical material.

No references cited.

JOSEPH R. LECLAIR, *Primary Examiner.*

D. F. NORTON, *Assistant Examiner.*